(12) United States Patent
Seuthe

(10) Patent No.: US 8,720,272 B2
(45) Date of Patent: May 13, 2014

(54) METHOD AND DEVICE FOR VIBRATION ANALYSES AND SAMPLE DATABASE THEREFOR AND USE OF A SAMPLE DATABASE

(76) Inventor: Ulrich Seuthe, Wetter (DE)

( * ) Notice: Subject to any disclaimer, the term of this patent is extended or adjusted under 35 U.S.C. 154(b) by 264 days.

(21) Appl. No.: 13/127,762

(22) PCT Filed: Nov. 2, 2009

(86) PCT No.: PCT/EP2009/007830
§ 371 (c)(1),
(2), (4) Date: May 5, 2011

(87) PCT Pub. No.: WO2010/051954
PCT Pub. Date: May 14, 2010

(65) Prior Publication Data
US 2011/0209546 A1    Sep. 1, 2011

(30) Foreign Application Priority Data

Nov. 7, 2008  (DE) ................. 20 2008 014 792 U

(51) Int. Cl.
*G01N 29/14* (2006.01)
*G01H 13/00* (2006.01)

(52) U.S. Cl.
USPC ................................. 73/579; 73/587; 73/659

(58) Field of Classification Search
CPC ....... B23Q 17/0976; B23Q 17/12; G01H 1/14
USPC ......................... 73/579, 593, 659; 702/39, 56
See application file for complete search history.

(56) References Cited

U.S. PATENT DOCUMENTS

| 4,901,575 A | | 2/1990 | Bohannan | |
|---|---|---|---|---|
| 5,144,838 A | * | 9/1992 | Tsuboi | 73/579 |
| 5,179,860 A | * | 1/1993 | Tsuboi | 73/579 |
| 5,216,921 A | * | 6/1993 | Tsuboi | 73/579 |
| 5,636,193 A | * | 6/1997 | Ohmi | 369/53.42 |
| 7,132,617 B2 | * | 11/2006 | Lee et al. | 219/109 |
| 7,516,022 B2 | * | 4/2009 | Lee et al. | 702/39 |
| 7,930,112 B2 | * | 4/2011 | Mattes | 702/36 |
| 8,186,223 B2 | * | 5/2012 | Dawson et al. | 73/587 |
| 8,401,823 B2 | * | 3/2013 | Klippel | 702/185 |
| 2004/0243351 A1 | * | 12/2004 | Calkins et al. | 702/185 |

FOREIGN PATENT DOCUMENTS

| DE | 3829825 | 3/1990 |
|---|---|---|
| DE | 42 42 442 A1 | 6/1994 |
| DE | 43 04 170 A1 | 8/1994 |
| DE | 9403901 | 8/1994 |
| DE | 440 05660 | 8/1995 |
| DE | 698 04982 | 11/2002 |
| DE | 10244426 | 4/2004 |
| DE | 103 40 697 A1 | 10/2004 |
| DE | 10 2005 034 768 A1 | 2/2007 |
| WO | WO 8807911 | 10/1988 |
| WO | WO 89/12528 | 12/1989 |
| WO | WO 2006/114242 A1 | 11/2006 |

* cited by examiner

*Primary Examiner* — J M Saint Surin
(74) *Attorney, Agent, or Firm* — Fay Sharpe LLP

(57) ABSTRACT

The invention relates to a method and to a device for sound emission analysis, wherein vibrations occurring during the use of a component, during the testing of a component or during the processing of a work piece by means of chipping, welding, forming, joining and/or separating or the like are registered and evaluated, wherein a vibration spectrum is recorded at different times or continuously and subjected to a multi-dimensional evaluation.

21 Claims, 5 Drawing Sheets

METHOD AND DEVICE FOR VIBRATION ANALYSES AND SAMPLE DATABASE THEREFOR AND USE OF A SAMPLE DATABASE

FIELD OF THE INVENTION

The invention relates to a method and to a device for the analysis of the vibration spectrum produced during the use of a component, during the testing of a component and/or during the processing of a workpiece by chipping, welding, forming, joining and/or separating or the like. The invention further relates to a sample database therefor and to the use thereof.

BACKGROUND OF THE INVENTION

Many methods are known in the prior art for monitoring the machining of workpieces.

A method for monitoring the operating state of a machine tool is thus known from DE 10 2005 034 768 A1 in order to diagnose critical states even before damage occurs and thus to avoid the costs and expense caused by damage and unplanned breakdowns. In the known method rotating components of a machine tool, such as rotors of tool spindles or motor spindles, pumps or fans, are monitored by means of a vibration sensor. For this purpose low-frequency vibrations are recorded by the vibration sensor in order to detect imbalances and/or tool vibrations and thus, for example, to detect a poorly balanced, incorrectly tensioned or worn tool. The evaluation is made by means of graphs on the basis of individual values of signal amplitudes at predetermined frequencies. However, an evaluation of this type of individual low-frequency vibrations, as is also known from DE 102 44 426 D4 and DE 103 40 697 A1, is only adapted to a limited extent for the assessment of a chipping process in terms of the quality of the machining of the workpiece.

In order to optimise a chipping process it is known from DE 698 04 982 T2 to record low-frequency vibrations during the machining of the workpiece and, depending on the information regarding the tool, to supply benchmark values for the speed of the tool, with which undesired vibrations which are known as chattering can be eliminated or reduced.

DE 44 05 660 A1 also deals with the reduction or prevention of such a chattering, which is recorded by a vibration sensor, a control mechanism being used to do this.

An arrangement of vibration sensors for obtaining a signal from the machining process is known from D 94 03 901. In this instance a structure-borne sound sensor is fixed to a sensing arm which is in contact with the workpiece, in such a way that sound signals and chattering vibrations generated by the machining process are transferred from the workpiece to the sensor. In this regard D 94 03 901 also mentions high-frequency sound signals. However, the term 'high-frequency' is used in conjunction with DE 38 29 825 A1, which feeds a frequency range between 20 kHz and 2 MHz to a mean-value former. Even this frequency range is hardly transferable and recognisable by the sensing arm coupling of D 94 03 901.

A method for assessing machining processes is known from DE 44 36 445 A1, in which method vibrations/structure-borne sound signals of a tool are registered on the one hand under load and on the other hand at the same speed with no load, and a one-dimensional comparison of the corresponding vibration number of the operation with no load and under load is made for each speed in order to assess the tool.

A cutting tool is known from each of WO 88/07911 and WO 89/12528 comprising an integrated sound sensor which supplies a one-dimensional voltage signal, which is proportional to the vibration frequency.

In DE 38 29 825 C2, during chipping of a workpiece the signal level of a sound sensor is registered as a function of the frequency and averaged over time intervals. A comparison of the mean values with threshold or setpoint values makes it possible to draw conclusions regarding the quality of the tool or the machining process.

The drawback that the tool and the chipping process can only be assessed inadequately is inherent to all known methods.

In addition, the known methods are limited to machining by means of chipping.

No reliable sound-based methods for monitoring other machining processes such as welding (laser welding, arc welding, etc.), forming, joining and/or separating or the like are known in the prior art.

For instance, optical systems for monitoring a laser process are thus currently used which measure the light reflected from the site of action and which attempt to derive from the spectrum or intensity how the actual laser process is taken up by the material. It is not therefore always possible to obtain satisfactory results, since a plurality of materials are interconnected and the process of penetration welding, i.e. whether the laser energy also results in the necessary melting and thermal penetration of all components, cannot be checked by the laser emission reflected on the surface.

In addition no reliable sound-based methods for monitoring components in operation are known in the prior art, for example a steel wheel of a train carriage during operation of the train, or a component of an engine during operation. In particular in the case of safety-relevant applications, such as in the transportation of people for example by trains, aircraft and motor vehicles, or in systems which are potentially dangerous, for example power stations, the avoidance of component failures is indispensable and is only possible at high cost by regular inspections and testing outside operation.

SUMMARY OF THE INVENTION

On this basis the object of the invention is to provide a method and a device for vibration analysis, in particular sound analysis, and a sample database therefor and a use of a sample database for vibration analysis, with which method and device it is possible to accurately monitor and/or assess a component, workpiece, tool and/or machining process.

This object is achieved in accordance with the features of claims 1, 16, 19 and 20, respectively.

A method for vibration analysis is thus provided, in which vibrations of a component or workpiece or tool are registered and evaluated, wherein a vibration spectrum being recorded at different times or continuously and being subjected to a multi-dimensional evaluation.

The vibrations can be produced during the use of a component, such as a steel wheel or an axle of a train in operation, during examination of a component in the installed or uninstalled state, optionally with the external excitation of vibrations by knocking or sound coupling or with motion, etc., and/or during the machining of a workpiece by chipping, welding, forming, joining and/or separating or the like. The use of a vibration analysis for each individual one of these applications and for further technically comparable applications is of independent inventive importance in each case.

The recording in accordance with the invention of the vibration spectrum at different times and preferably continuously or quasi-continuously using an expedient sample rate enables a multi-dimensional data evaluation which forms the basis for a precise assessment of a component, workpiece, tool and/or a machining process.

For a preferred embodiment with three dimensions the multi-dimensional data evaluation can be illustrated, for example, by a landscape which can extend, for example, in space defined by a frequency axis, time axis and amplitude axis. The landscape visualises the sound emissions over time and comprises characteristic features which each practically form a fingerprint. These characteristic features can be determined using suitable methods. Deviations from these characteristic features can also be determined. Features which are characteristic of specific faults or fault types can also be determined in the multi-dimensional data. On the whole, the quality of a machining process of a work-piece can be determined, in particular still during the machining process in real time in a highly reliable manner, in particular on the basis of the multi-dimensional data, which in the preferred embodiment form a landscape in the frequency-time-amplitude space, and more specifically universally with a large number of machining processes, such as chipping, welding, forming, joining, separating and/or the like. The level of wear of the tool or a tool fault, such as a fractured drill, can also be determined and identified using the corresponding characteristic features. Lastly, when testing a component the deviation from expected characteristic features can be determined and the conformity to fault characteristics can diagnose a specific fault or fault type. The component can even be tested during operation of the component; for example during operation of a train a vibration spectrum and in particular a sound emission spectrum can be measured on the axle or the wheel and examined for characteristic features, for example in order to determine wear, a level of wear, a fault such as a fracture or a crack, or else standard behaviour or, quite generally, a deviation from standard behaviour.

The evaluation is preferably carried out in an automated manner based on sample recognition. For multi-dimensional and, in particular, three-dimensional sample recognition suitable algorithms can be used which can be formed quickly and reliably in a computer-based manner and with adjustable recognition parameters, and which access stored vibration spectrum data or process the vibration spectrum data in real time.

A sample database with samples suitable for a specific application is expediently provided. The samples can be stored in the form of sample landscape portions, optionally with tolerance ranges, and/or can be defined by functions. On the one hand this makes it possible to use predetermined samples for a specific application or class of application, for example samples for a specific drilling process step. In addition, data can be collected during a learning phase and stored as samples and optionally with tolerance values. For example the sound emission spectrum can thus be recorded during drilling and replacement of workpieces and tools, and samples can be extracted therefrom, on the basis of which subsequent machining processes can be assessed. It is thus possible to individually adapt the samples, for example to a specific process or a specific processing machine or a specific component or a specific test situation for a component, in a simple manner and in an automated manner if necessary. The samples may cover value ranges in order to define tolerable deviations and/or simplify the recognisability.

For automated assessment an envelope of the recorded vibration spectrum or of portions thereof is preferably formed and compared with a comparative envelope. For example the envelope is formed by a smoothing function, from averaging datapoints that are adjacent in space or by using expedient methods to smooth multi-dimensional data. The deviation between the envelope and the comparative envelope can be used as a benchmark for assessing a component, workpiece, tool and/or process, for example the quality of a machining process. In addition, the use of an envelope makes it possible to identify, in an automated manner, portions of a process such as workpiece contact or a specific machining process. In addition, the sample recognition is simplified by using an envelope and the recognition rate is improved.

The vibration spectrum is preferably recorded and evaluated at high frequency and/or over a wide band.

Wide band capability is expedient since characteristic features may occur in regions of the sound emission spectrum which are spaced far from one another in terms of frequency. For instance, a crack formation thus has a high-frequency 'fingerprint', whereas a fractured drill leaves behind relatively lower frequency features in the sound emission spectrum, and a machine fault, such as defective concentricity of a lathe, leaves behind characteristic features in the low-frequency range of the vibration spectrum. The entire frequency spectrum of the vibrations is preferably recorded, different sensors optionally being provided for this purpose which cover different frequency ranges. In the preferred embodiment only one sensor is used, namely a sound sensor, but in other embodiments other vibration sensors can be used in addition or alternatively.

The high-frequency recording advantageously makes it possible to also assess microscopic processes on or in the component or workpiece or tool.

For example during the chipping process of a solid body material parts are torn from their position against their bonding force. The force necessary for this is applied by a tool. The bonding forces exist between microscopically small parts. The chipping process can therefore also be understood as a succession of microscopic separations. Each of these small separations sends an impulse through the adjacent materials. Vibrations are produced by these impulses. The vibration frequencies depend on the duration of the impulse and the resilience of the material. Each chipping process consists of a succession of lots of microscopic separations, i.e. also of a sequence of lots of small impulses. These impulses are produced in chronological succession. Once a microscopic separation has taken place, a separation force forms again over the path of the chipping tool at the next material particles which are still bonded. Once the necessary separation force has been exceeded, the next impulse is produced. New vibrations are thus always excited, of which the distribution over time is linked to the cutting speed and the size of the separated material particles. A vibration excitation of material and tool is thus produced, of which the courses of frequency and amplitude are characteristic for the respective chipping process.

These microscopic separations consequently lead to a high-frequency chipping vibration spectrum, from which characteristics can be obtained regarding the actual chipping process on a microscopic level.

In the further applications of the invention, for example welding or component testing, high-frequency characteristic features also occur in the vibration spectrum.

The recorded vibration spectrum is preferably subjected to a frequency-time analysis. As a result of the frequency-time analysis the registered vibrations can be allocated to the course of the process along the time axis on the one hand, and on the other hand the vibrations of interest can be separated from vibrations which are not of interest, for example machine vibrations and spurious vibrations, which occupy other frequency ranges. The evaluation can therefore concentrate on the range which is characteristic for the respective application.

The vibration spectrum is preferably recorded using a frequency resolution which corresponds to the microscopic granularity of the material of the component or workpiece and optionally to further application-dependent factors. In a chipping process the chipping rate is, for example, to be considered as a further factor. For example at a chipping rate of 3000 m/min a frequency resolution of 50 MHz is thus necessary in order to detect structures of approximately 1 μm through associated chipping vibrations. Depending on the microscopic granularity, which may lie above or below the μm range, and depending on the chipping rate, higher or lower frequency resolutions may be provided. In accordance with the invention the frequency resolution preferably lies at 50 MHz in order to cover all applications, but can also lie in the region of 40 MHz, 30 MHz, 20 MHz or 10 MHz.

The vibration spectrum can be recorded with the coordinates of frequency f, time t and amplitude A. This recording is suitable for a numerical analysis in the computer, the coordinates also possibly being functions a(f), b(t) and/or c(A) of the frequency f, time t and amplitude A, or a(f, t, A), b(f, t, A) and/or c(f, t, A), in such a way that a three-dimensional array is stored in a given functional dependency to f, t, A, for example (lf, mt, $nA^x$), where l, m, n and x are any numbers. For purposes of illustration and/or manual analysis the vibration spectrum can be illustrated in a graph using the three coordinates. In this instance a three-dimensional illustration can be selected, in which the frequency and time span a plane and a height profile is defined by the amplitude (or a function thereof). Such a graphical illustration facilitates the recognition of the relevant vibrations to be assessed, for example these can be associated with the course of the machining process by the separation on the time axis, and are separated from machine vibrations and other spurious vibrations on the frequency axis.

In order to register the vibrations a sound sensor is preferably used, in particular a piezo sound sensor. Such sound sensors can process the high frequencies which are necessary in accordance with the invention, have a large frequency bandwidth, can be produced in a cost-effective manner and do not require maintenance.

The sensor, in particular the sound sensor, which can be arranged on the component, workpiece or on the tool or on a component which is coupled in vibration with the component, workpiece and/or tool, is calibrated after its assembly and then also periodically thereafter or before each use. A constantly high precision of the measurement is thus ensured. In particular calibration is thus particularly expedient if the sensor is attached to a new workpiece or has to be removed for maintenance purposes and then reattached, since another coupling behaviour may be set as a result of the attachment. In accordance with the invention, for calibration the sound sensor is subjected to a specific electrical impulse in order to emit a sound signal. The echo of the sound signal is then recorded and compared to a setpoint echo. The quality of the coupling of the sound sensor to the workpiece or tool or component can thus be ascertained and taken into consideration during the measurement.

The evaluation is preferably carried out in real time. There is thus no requirement to store data. Storage of data may be expedient in safety-relevant components in order to document the absence of a fault, or in order to document a fault. The data can be stored in full for the entire machining process or for the entire monitoring period of a workpiece or component, or else only in part in time domains in which features of interest have been recognised.

A further aspect of the invention relates to the transformation of the vibration spectrum or a frequency range thereof which is of interest into the audible sound spectrum by means of a suitable, for example linear, function or mapping. This makes it possible to achieve audible monitoring and assessment by a person. The audible monitoring is expediently carried out in addition to the multi-dimensional evaluation, but can also replace it.

In a particularly expedient embodiment samples which are typical of damage are detected in the vibration spectrum. Inter alia, this can simplify the evaluation which is limited to fault recognition.

The invention also makes it possible to record faults which are not directly linked to the machining of a workpiece. For example stress cracks caused by fluctuations in temperature or general damage caused by external sources can also be recognised.

Overload and/or fatigue cracks can also be recognised. This is advantageous, in particular when testing a component or when observing a component in operation, for example when monitoring a wheel of a train carriage.

The invention thus provides methods and devices which make it possible to monitor, ensure the quality of, and test components, workpieces and machining processes in an automated manner.

Further features and configurations of the invention will emerge from the following description given with reference to the accompanying drawings.

DESCRIPTION OF THE EMBODIMENTS

The invention will first be explained below with reference to the embodiment of a chipping process.

Figure 1:
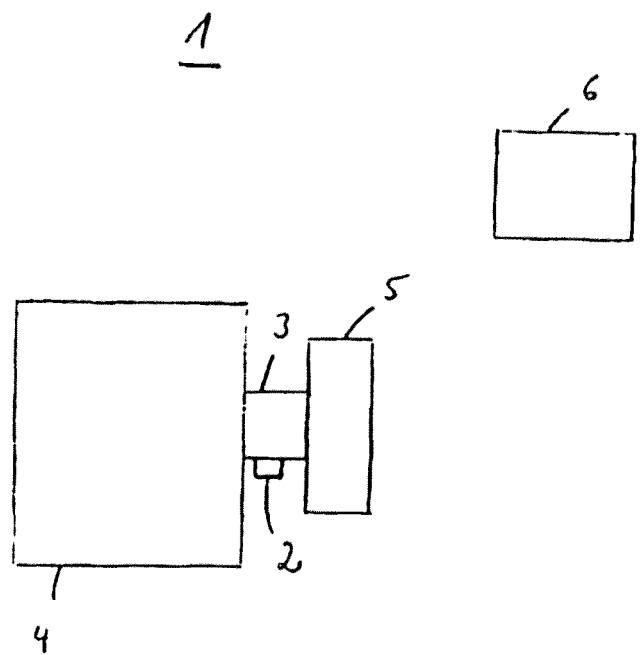
FIG. 1 is a schematic view of a device for assessing chipping processes.

The device 1 shown in FIG. 1 for carrying out a vibration analysis, in this instance for the purposes of assessing a chipping process, comprises a sensor 2 for detecting vibrations, which is arranged for example on a tool 3 or a machine tool 4 which can chip a workpiece 5. The sensor 2 is connected to an evaluation unit 6, for example a computer. In further configurations of the invention the workpiece is otherwise machined, for example welded, formed, joined and/or separated or a component is tested or observed during its use when assembled.

The sensor 2 is preferably a structure-borne sound sensor, for example a piezo sensor, and can preferably not only record, but also emit structure-borne sound signals. The emission of structure-borne sound signals is expedient in particular for the testing of components, since these can thus be vibrated. Other types of sensors can also be used, provided they can register vibrations within the frequency range of interest, for example motion sensors.

The sensor 2 is either coupled to the tool 3, as shown by way of example, or to the machine tool 4 or to the workpiece 5 or to a part which is coupled thereto in terms of vibration, in such a way that it can register vibrations of the workpiece 5 and/or of the tool 3. In the simplest case the sensor is screwed securely.

The machine tool 4, for example a miller machine, carries out a machining process on the tool 5, for example a steel block, using the tool 3, for example a miller, in particular in an automated manner, in order to form a gearwheel for example from the block of steel.

During the machining process vibrations are generated on the workpiece 5 and tool 3 which are recorded by the sensor 2. For this purpose the sensor 2 is designed in such a way that it can register frequencies between a lower threshold value and an upper threshold value. Ideally, the lower threshold value is 0 and the upper threshold value is ∞, in such a way that the entire spectrum of interest can be recorded. In practice an upper threshold value of at least 50 MHz, preferably at least 100 MHz is expedient. Frequencies below 90 kHz or 40 kHz are preferably damped or cut off, since they do not contain any usable information, so a corresponding lower threshold value is expedient, but can also lie at 200 kHz, 500 kHz or 1 MHz.

Figure 2:
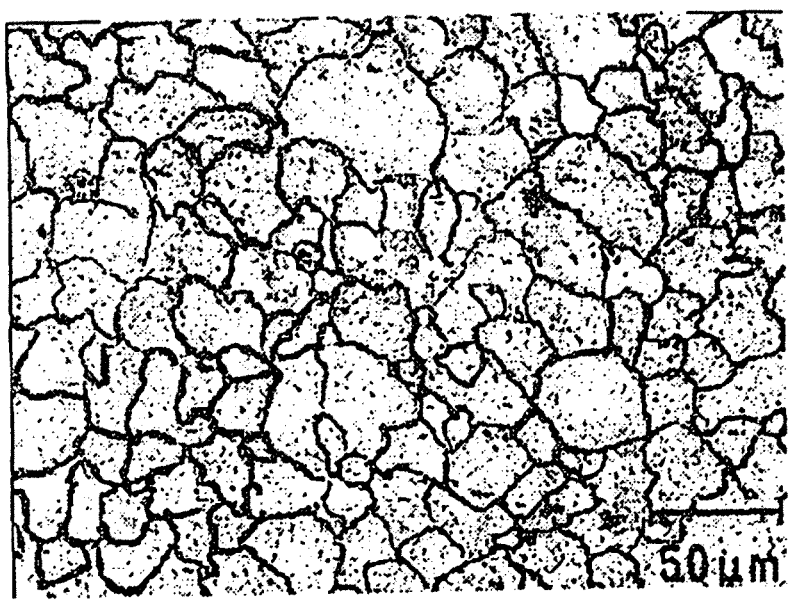
FIGS. 2 and 3 show crystallites in a steel structure.
Figure 3:
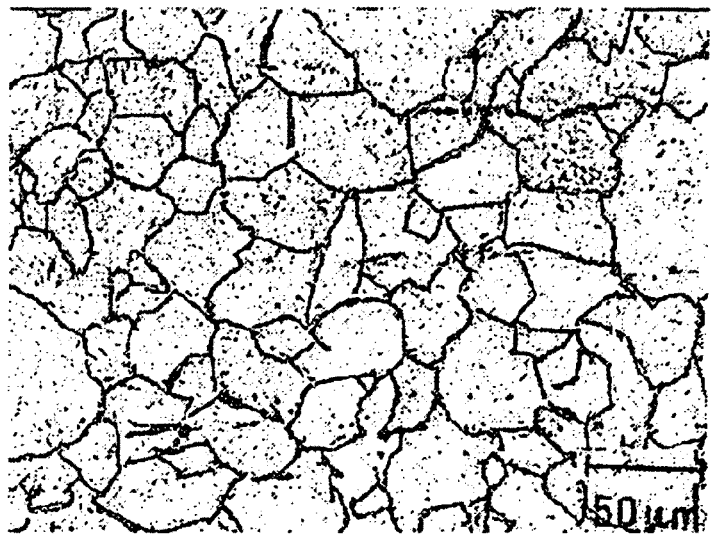

The actual frequency range of the sensor 2 should be selected on the basis of the material to be machined and the machining rate. FIGS. 2 and 3 show typical crystallites in a steel structure. The particle sizes clearly vary in terms of their size, more specifically depending on the cooling process and alloy constituents. If the granularity of the material is 1 μm for example and the machining rate is 3000 m/min, the upper threshold value should be at least 50 MHz in order to detect the chipping vibrations of interest. At a machining rate of 400 m/min and with a mean particle size of 1 μm, a minimum resolution of 6.66 MHz is given. However, since the tip of the tool (for example 1 mm) is very large compared to the crystallites (for example 1 μm), it always detects a lot (for example 1000) of crystallites simultaneously, more specifically slightly displaced by fractions of the particle size; a substantially higher frequency resolution than the minimum resolution is therefore expedient in order to detect all frequency information of interest regarding the chipping process.

The vibrations registered by the sensor 2 during the chipping of the workpiece 5 are evaluated in a multi-dimensional manner. For this purpose the vibration spectrum recorded can be buffered in the evaluation unit 6, which is preferably a computer with a corresponding interface and suitable storage media.

In the evaluation unit 6 a frequency-time analysis may take place in such a way that the vibration spectrum is illustrated graphically already during the recording or thereafter and/or is analysed numerically.

Figure 4:
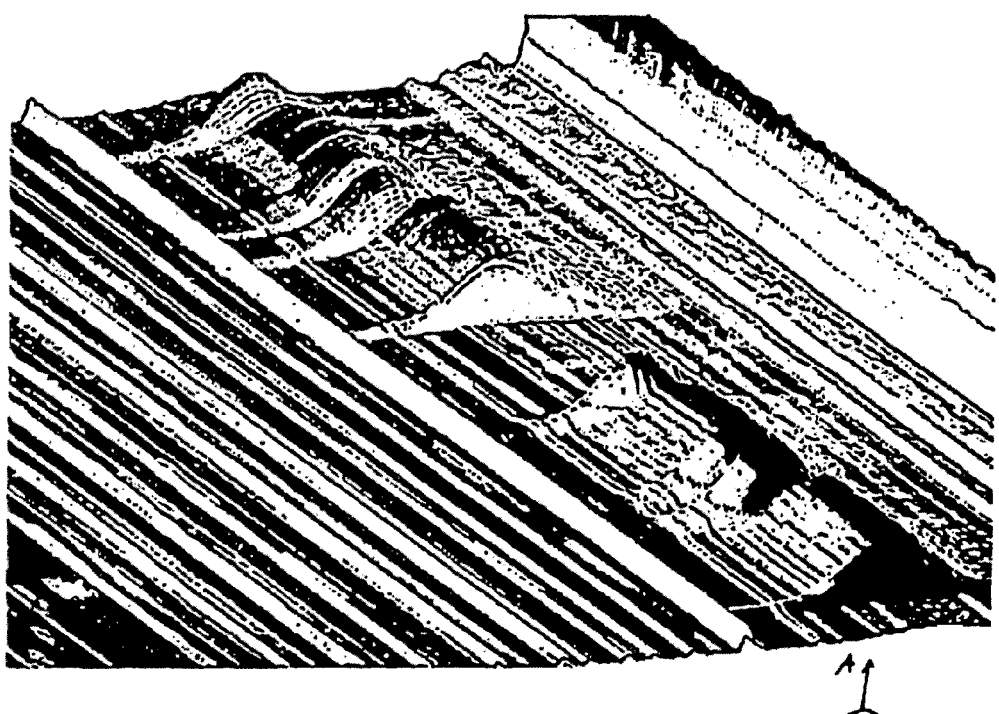
FIG. 4 is a three-dimensional illustration by means of a graph of a vibration spectrum.
Figure 5:
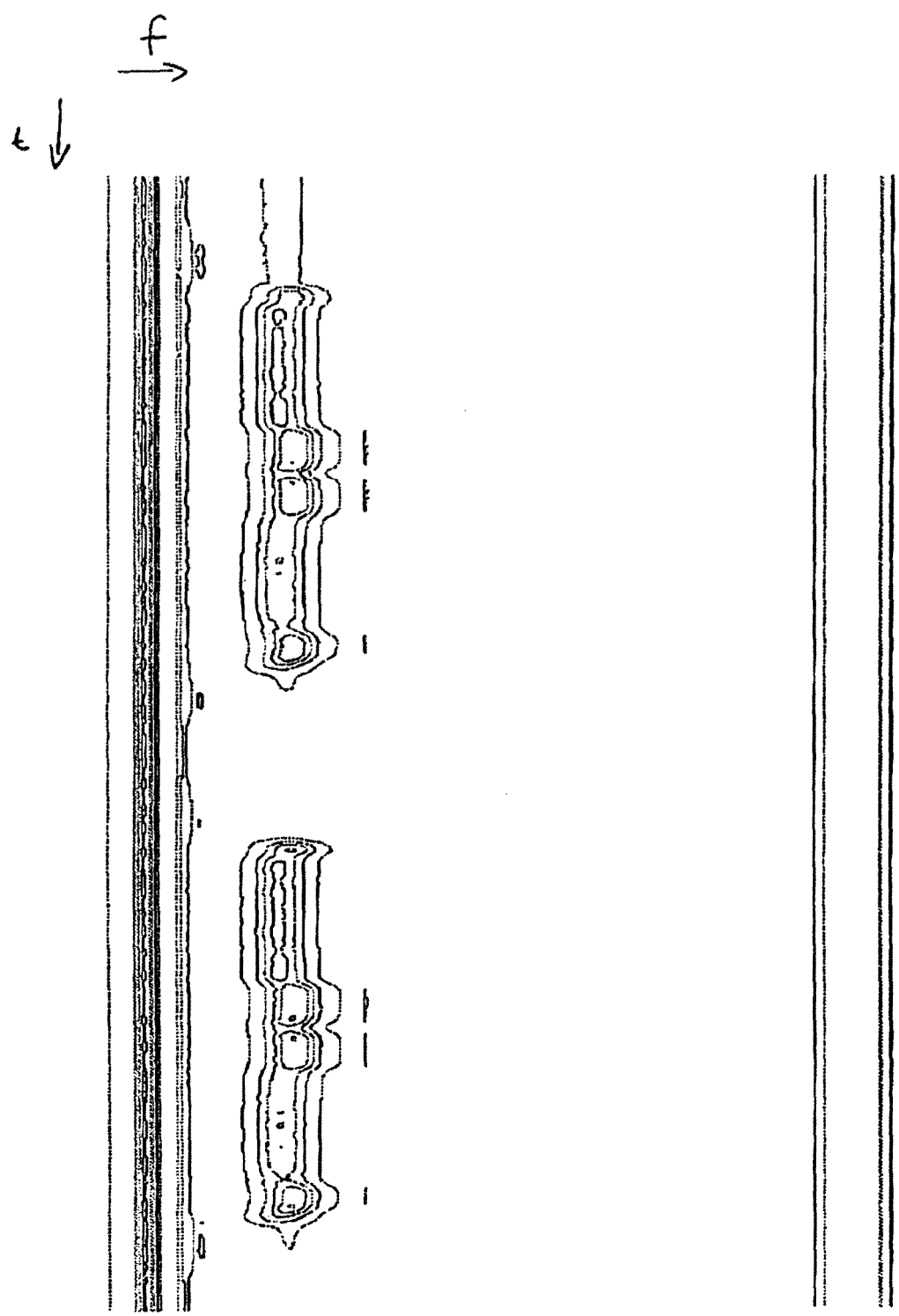
FIG. 5 is a two-dimensional view of a detail from FIG. 4.

An illustration may be provided three-dimensionally, as shown in FIG. 4, with the co-ordinates of time, frequency and amplitude (or maximum amplitude or intensity or the like) or two-dimensionally, as shown in FIG. 5, wherein contour lines make the amplitude visible. In FIG. 5 the driveshaft is visible on the left at low frequencies, high-frequency disturbances are arranged on the right and the successive grinding of two teeth of an automotive gear shaft can be seen in the middle. An intersection at a time t is shown in FIG. 6, which shows a typical frequency spectrum.

Samples can be recognised, in particular the islands in FIG. 5 which are characteristic for the respective process. Such samples are also given for faults. Process steps can consequently be detected by sample recognition and assessed, for example by ascertaining a measure for the deviation from a sample, and faults can also be detected and identified (fractured drill, no tool, etc.), and in any case deviations from the standard behaviour can already be detected during a machining process.

Figure 6:
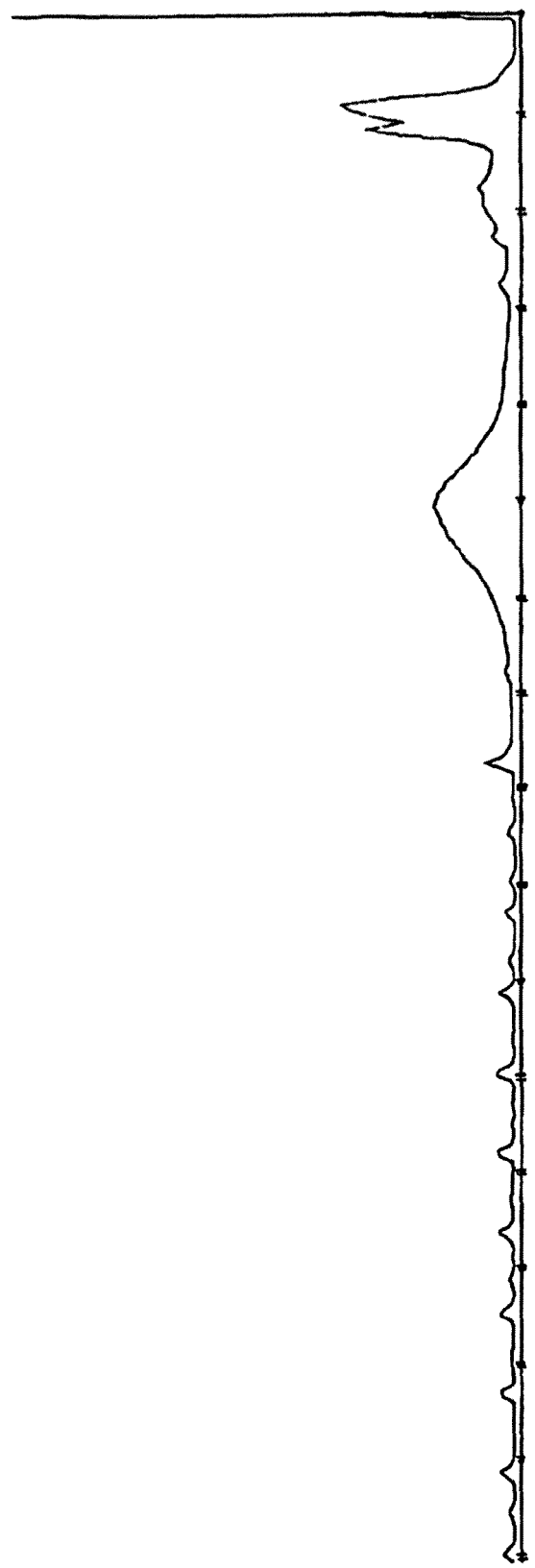
FIG. 6 shows a section through FIG. 4 parallel to the f-axis.

The evaluation can take place on the basis of FIG. 4, 5 or 6, compared with comparative data or empirical data and from this characteristics regarding the chipping process can be derived. For this purpose samples can be used from a sample database. The samples can be stored in a sample database or may be functionally described characteristic surface portions, the presence of which in the detected vibration spectrum is to be determined.

Figure 7:
FIGS. 7 and 8 show a projection of the entire recorded frequency scope of FIG. 1 over the time axis for different tools.
Figure 8:

FIGS. 7 and 8 show a projection of the entire recorded frequency scope of FIG. 1 on the time axis, so that a two-dimensional image is produced. These are records of two directly successive turning processes on a steel component. FIG. 7 shows the emission during use of a worn tool, whereas FIG. 8 shows the emission after installation of a new tool. FIG. 8 is evidently smoother and could be used as a reference for the specific turning process, wherein differences to this can be used to assess the tool and/or the workpiece. In this instance corresponding reference envelopes can be laid around the region detected in an automated evaluation of the registered three-dimensional data records. Differences, mean values, scatterings and the like could be used as a benchmark for the quality of the machining process, the tool, etc.

The vibration spectrum depends not only on the tool and the workpiece, but also on the machining rate, the machine tool, the consumables (for example cutting oil), etc. The vibration spectrum can thus also provide information regarding the machine tool or the consumables, etc. The vibration spectrum may thus possibly be modulated by the vibrations of the machine tool, for example 200 Hz.

The sensor 2 will comprise a non-linear frequency response which depends on the entire system formed of machine tool, tool and workpiece. The frequency response is individual to each sensor and is also dependent on the torque of its fixing, system resonances, machine noise, etc. A particularly periodic calibration during the measurements is thus expedient. The calibration may take place as a result of the sensor 2 emitting an impulse and the impulse response being evaluated.

Detection of a crack will be described hereinafter as an embodiment.

When components, for example wheels, are stressed it is possible to detect a crack, in a highly reliable manner, by using wide band real-time monitoring of structure-borne sound signals.

A frequency-detective observation makes it possible to achieve selective filtering of normal working noise and spontaneous component damage caused by overload or fatigue cracks in the structure.

Each structural separation emits an impulse-like structure-borne sound emission which can be separated from the normal process noises.

Real-time observation of the preferably entire frequency curve over time makes it possible to detect changes over the course of the process and to act on such fluctuations in a regulatory manner, in such a way that damage can be avoided in a preventative manner.

In systems like testing equipment in which damage is caused deliberately, the development of normal damage progress can be observed. It is thus possible to asses not only the extent of the damage afterwards, but also the progress over time of the formation of the damage and the quantitative appearance during the development of the damage.

By comparing the detected vibration spectrum with stored damage samples and standard samples it is possible to react in a very versatile manner to damage occurring in a component or to process drifts, even if frequency ranges shift or change, or new (previously unknown) signals are detected.

Such a versatile reaction and recognition is not possible with a frequency separation or frequency filtering established from the outset.

The invention can also be applied in the case of welding, in particular in the case of laser welding.

During material machining with a laser the materials are heated and the stresses in the structure are thus altered. Each stress change of this type generates a pressure wave which spreads through the material. These fluctuations in pressure as a result of the thermal deformation by laser energy can be detected by means of a structure-borne sound sensor and evaluated in accordance with the invention.

Optical systems for monitoring a laser process are currently used which measure the light reflected from the site of action and which attempt to derive from the spectrum or intensity how the actual laser process is taken up by the material. It is not always possible to obtain satisfactory results with this, since a plurality of materials are interconnected and the process of penetration welding, i.e. whether the laser energy also results in the necessary melting and thermal penetration of all components, cannot be checked by laser emission reflected on the surface.

In accordance with the invention, structure-borne sound sensors on the components or workpieces can be used to detect whether fluctuations in stresses as a result of thermal heating are produced in the components, and the fluctuations in stresses can be analysed in order to assess the welding process.

The energy consumption by the laser light generates fluctuations in temperature in the structure and thus varying pressure stresses, pressure waves and frequencies which make it possible to draw conclusions regarding the type of thermal changes in the structure. It is thus possible to map the welding energy and/or the energy absorbed by the material. In particular, welding faults such as the incomplete penetration welding of a plurality of components to be connected, the formation of holes owing to excessive energy transfer or the failure of the laser beam can be detected by the multi-dimensional evaluation in accordance with the invention of the vibration spectrum.

The vibration sensor or in particular the sound sensor, optionally the plurality of sound sensors, can be coupled in terms of vibration to the workpieces by means of a device. The sensor(s) can also be placed on holding devices which are contacted with the components or workpieces in a manner coupled in terms of vibration during the stressing of the components or workpieces.

In accordance with the invention an in-process monitoring of a machining process, in particular of a laser welding process is made possible, in which no further measures for monitoring or assessing the quality are necessary.

The invention is also suitable for monitoring a forming process.

In each forming process of solid bodies stresses are introduced or broken in the component. These changes in force lead to pressure waves which spread though the component and the tool.

The frequencies of these pressure waves depend on the dynamics of the forming process, on the speed of the force and also on the structure of the material.

Very high frequencies can occur in general. The analysis of the sound emission in terms of frequency and time makes it possible to accurately describe the forming process and practically forms a fingerprint of each specific forming process. In this instance variations are possible owing to different material properties and progress of the process.

The method according to the invention can be applied both to cold forming and to hot forming. Faults such as damaged, broken or faulty forming tools can be detected. Varying strengths of the component during the forming process, the absence or altered properties of operating materials such as grease/lubricants, and during hot forming in particular variations in temperature, can be detected. Even small differences in temperature of 1° C. can lead to considerable changes in the forming forces and thus to altered properties of the forming dynamics and the pressure wave emissions.

If the component cools within the forming process during the detection of vibrations, the stress relief or cooling and shrinking process and the structural trans-formation process of the material can also be observed and assessed and a conclusion can be drawn with regard to the cooling process.

This applies both to vibrations, in particular structure-borne sound emissions, which originate from the structural transformation itself, and also from emissions which are caused by forces between the component and the tool and are generated during the change in volume.

The invention clearly makes it possible, quite generally, to observe and assess practically all machining processes, in particular in an automated manner, using the vibration spectra which occur during the machining process, including any cooling phase or the like, which spectra, as described, comprise characteristic features for standard behaviour and deviations therefrom. In addition to the chipping, weld-based and forming machining processes described above by way of example, the invention can also be applied to joining and separating processes.

Different parts interact with one another during each joining or separating process. During the movement the surfaces rub against one another, material parts are scraped against one another and separated, and forces are introduced in any form. Each of these activities generates pressure waves which run through the components in question and which are characteristic for the respective joining or separating process and can be typified.

It is therefore possible to quantify and qualify the joining and separating processes in terms of different properties, i.e. to define and recognise characteristic features.

For example, when pressing a shaft into a socket, the two being produced with tolerances, the sound emission pressure waves provide a measure for the insertion forces. With an excessive oversize or unfavourable tolerance design, a very strong sound signal is produced, which may indicate a fault in the pressingin process. With the multi-dimensional evaluation according to the invention of the recorded vibration spectrum, these faults can be recognised, for example by comparison with setpoint samples. Different surface properties, for example excessive surface roughness or material changes, can also be detected since these comprise characteristic properties in the vibration spectrum.

A screwed connection does not primarily yield anything different. In this case too, surfaces are driven and pressed against one another and the torque applied, together with the friction properties, generates sound emissions which can be typified and in turn can be used to qualify the screwed connection.

The foregoing can also be applied to separating processes, for example the expulsion of pins from sockets, squeezing out, unscrewing, cutting, etc.

The machining process is quite generally only concluded once no more changes occur on the component or workpiece. For example in the case of forming or joining or welding, etc. the vibration spectrum can thus be analysed over a longer period of time, for example in order to determine any stresses which occur with changes in temperature and which might lead to damage of the components, even once the effect on the component or workpiece has been terminated directly.

The invention claimed is:

1. A method for vibration or sound analysis of a component to determine if said component is properly working or if a part is properly formed by use of said component, in which vibrations or sounds occurring by one or more operations selected from the group consisting of a) use of said component and b) testing of said component, said component included in a workpiece used for chipping, welding, forming, joining, separating or combinations thereof, said vibrations or sounds are registered and evaluated, wherein a vibration spectrum using said vibrations or sounds is recorded at different times or (quasi-) continuously to create multi-dimensional data based on at least two dimensions selected from the group consisting of time, vibration or sound frequency and vibration or sound amplitude, said multi-dimensional data is subjected to a multi-dimensional evaluation, said multi-dimensional evaluation including a comparison of said multi-dimensional data to reference data to determine deviations between said multi-dimensional data and said reference data.

2. The method according to claim 1, wherein the evaluation is carried out in a three-dimensional manner.

3. The method according to claim 1, wherein the evaluation is carried out in an automated manner on the basis of a sample recognition.

4. The method according to claim 3, wherein the sample recognition searches for samples in the vibration spectrum recorded over a period of time, which samples are stored or defined in a sample database.

5. The method according to claim 1, wherein an envelope of the vibration spectrum is formed and compared with a comparative envelope.

6. The method according to claim 1, wherein the vibration spectrum is registered, is evaluated or combinations thereof in a high-frequency manner, wide band manner, or combinations thereof.

7. The method according to claim 1, wherein the vibration spectrum is subjected to a frequency-time analysis.

8. The method according to claim 1, wherein the vibration spectrum is illustrated graphically with the variables of frequency, time, amplitude or a function thereof.

9. The method according to claim 1, wherein a sound sensor is used to record the vibration spectrum.

10. The method according to claim 9, wherein the sound sensor is calibrated by emitting a sound signal via the sound sensor before the measurement, registering the echo and comparing it with a set point echo.

11. The method according to claim 1, wherein the evaluation is carried out substantially in real time.

12. The method according claim 1, wherein the recorded vibration spectrum is transformed into the audible range for acoustic assessment by a user.

13. The method according to claim 1, wherein samples which are typical of damage are recognize in the vibration spectrum.

14. The method according to claim 13, wherein overload, fatigue cracks, or combinations thereof are recognized.

15. A device for carrying out a vibration analysis, in particular according to claim 1, wherein the device can be coupled to a sensor for recording a vibration spectrum which is produced during the use of a component, during the testing of a component, or during the machining of a workpiece by means of one or more mechanism selected from the group consisting of chipping, welding, forming, joining and separating, and comprises an evaluation unit for the multi-dimensional evaluation of the vibration spectrum recorded at different times or (quasi-)continuously.

16. The device according to claim 15, wherein a high-frequency sensor is provided to register a structure-borne sound spectrum.

17. The device according to claim 15, wherein a sample database is provided with multi-dimensional vibration samples.

18. A sample database for a device according to claim 15, comprising multi-dimensional vibration samples which are characteristic for features in regions of a vibration spectrum which is generated during the use of a component, during the testing of a component and/or during the machining of a workpiece by means of one or more mechanism selected from the group consisting of chipping, welding, forming, joining and separating.

19. A use of a sample database according to claim 18 for observing a component in operation, testing a component, or observing a machining of a workpiece by means of one or more mechanism selected from the group consisting of chipping, welding, forming, joining and separating.

20. A method for vibration or sound analysis of a component to determine if said component is properly working or if a part is properly formed by use of said component, in which vibrations or sounds occurring by one or more operations selected from the group consisting of a) use of said component, and b) testing of said component, said component included in a workpiece used for chipping, welding, forming, joining, separating or combinations thereof, said vibrations or sounds are registered and evaluated, wherein a vibration spectrum using said vibrations or sounds is recorded at different times or (quasi-) continuously and is subjected to a multi-dimensional evaluation, and wherein the case of machining by chipping the vibration spectrum is recorded using a frequency resolution which corresponds to the microscopic granularity of the material of the component of the machined workpiece and to the machining rate of the chipping process.

21. A method for vibration or sound analysis of a component to determine if said component is properly working or if a part is properly formed by use of said component, in which vibrations or sounds occurring by one or more operations selected from the group consisting of a) use of said component and b) testing of said component, said vibrations or sounds are registered and evaluated, wherein a vibration spectrum using said vibrations or sounds is recorded to create multi-dimensional data based on at least three dimensions selected from the group consisting of time, vibration or sound frequency and vibration or sound amplitude, said multi-dimensional data is subjected to a multi-dimensional evaluation, said multi-dimensional evaluation including a comparison of said multi-dimensional data to reference data to determine deviations between said multi-dimensional data and said reference data.

* * * * *